United States Patent
Muxfeldt

[11] 3,914,299
[45] Oct. 21, 1975

[54] TETRACYCLINES
[75] Inventor: Hans H. Muxfeldt, Ithaca, N.Y.
[73] Assignee: Research Corporation, New York, N.Y.
[22] Filed: Feb. 2, 1973
[21] Appl. No.: 329,140

Related U.S. Application Data
[63] Continuation-in-part of Ser. No. 832,681, June 12, 1969, abandoned.

[52] U.S. Cl. ... 260/559 AT; 260/240 R; 260/340.9; 260/520; 260/561 K; 260/590
[51] Int. Cl.² ........................................ C07C 103/19
[58] Field of Search ............................ 260/559 AT

[56] References Cited
UNITED STATES PATENTS

| | | | |
|---|---|---|---|
| 2,970,087 | 1/1961 | Beck et al. | 260/559 AT |
| 3,036,129 | 5/1962 | Hlavka et al. | 260/559 AT |
| 3,188,348 | 6/1965 | Butler et al. | 260/559 AT |
| 3,373,197 | 3/1968 | Martell et al. | 260/559 AT |
| 3,433,709 | 3/1969 | McCormick et al. | 260/559 AT |

OTHER PUBLICATIONS

Harrer, Paul, *Organic Chemistry*, Nordeman Publishing Co., New York, 1938, pp. 434–435 relied on.

Fieser et al., *Organic Chemistry*, D. C. Heath and Co., Boston, 2nd edition, 1950, pp. 650–651 and 742–743 relied on.

*Primary Examiner*—Donald G. Daus
*Assistant Examiner*—Anne Marie T. Tighe
*Attorney, Agent, or Firm*—Brumbaugh, Graves, Donohue & Raymond

[57] ABSTRACT

A group of tetracycline compounds have been discovered having unexpected biological activity. These compounds are the 5a-epitetracyclines having the structure:

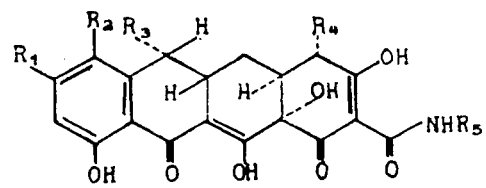

wherein $R_1$ is H or OH, $R_2$ is H or halogen, $R_3$ is H or $CH_3$, $R_4$ is dimethyl amino or benzamido, and $R_5$ is H or lower alkyl.

2 Claims, No Drawings

TETRACYCLINES

This application is a continuation-in-part of application Ser. No. 832,681, filed June 12, 1969, now abandoned.

This invention relates to a group of tetracyclines.

A group of important antibiotics has now been known for a number of years which has the basic structure of:

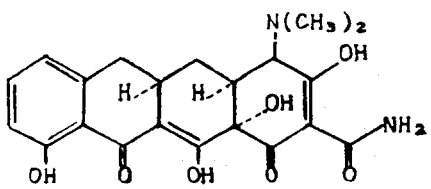
(1)

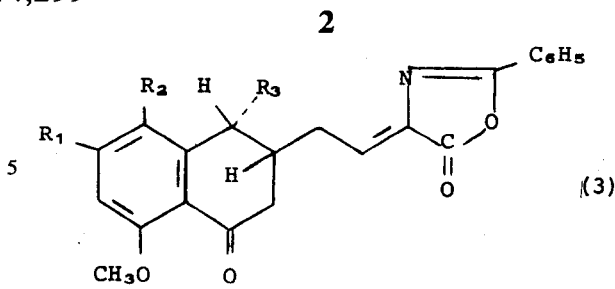

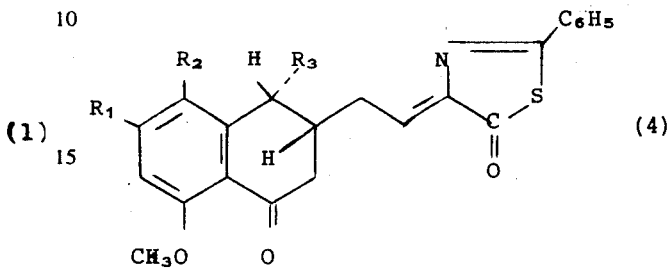

This basic compound (1), 6-deoxy-6-demethyltetracycline, is the simplest of the tetracycline compound which retains full biological activity against both Gram-negative and Gram-positive bacteria.

Study of this and related compounds has led researchers to the belief that the steric relationship among the various substituent groups on the tetracycline ring system plays an important role in determining the biological activity. The steric relationships, as indicated in the foregoing structural formula, place the 12a hydroxyl group, the 4-dimethyl amino group, the 4a hydrogen and the 5a hydrogen all on the same side of the ring system. (It will be understood that the structural formula set forth above, as well as those to be described hereinafter, are not intended to imply knowledge of the absolute configuration of the biologically active form of the tetracyclines but only the relative steric relationship of the important substituent groups.)

Quite surprisingly, in view of the foregoing, a group of biologically active tetracyclines has been discovered in which the 5a hydrogen is in the anti position relative to the 4a hydrogen, in contrast to the syn position which was heretofore believed to be essential in biologically active tetracycline compounds. Indeed, a number of the tetracyclines which have now been discovered are found to exhibit significantly different spectrum biological activity than their "natural" steric isomers.

Compounds within the scope of the present invention may be represented by the formula:

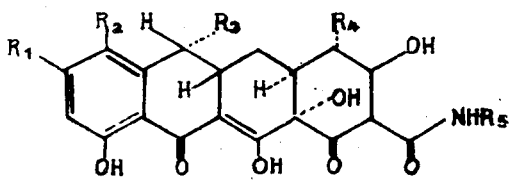
(2)

wherein $R_1$ is H or OH, $R_2$ is H or halogen, $R_3$ is H or $CH_3$, $R_4$ is dimethyl amino or benzamido, and $R_5$ is H or a $C_1$-$C_4$ alkyl. Preferred compounds are those in which $R_1$ is hydrogen, $R_4$ is dimethyl amino, and $R_5$ is hydrogen. It is also preferred that $R_2$ be either hydrogen or chlorine.

The compounds of the present invention are accessible through condensation of an azlactone or thiazolone of the structure:

with an appropriate methyl-3-oxoglutaramate. The resulting condensate is a tetracyclic compound which may be suitably manipulated to remove protective groups, and thereby derive the desired end products. The preparation of these compounds is set forth in more detail in the examples, and is illustrated in the drawings.

EXAMPLE 1

Preparation of the Azlactone

1a. Esterification of (5)*

*This preparation as well as those which follow, reported in the doctoral thesis of Jeffrey Michael submitted to the University of Wisconsin.

25 grams of (5) were dissolved in 300 milliliters of methanol containing 5 percent by volume of concentrated sulfuric acid. The solution was refluxed for 2 hours, then poured into 800 milliliters of ice water. The white precipitate was filtered, washed with water, and crystallized from methanol. 23.5 grams (89% yield) of crystalline methyl ester were obtained. The identity of the product was confirmed by elemental analysis.

1b. Ketalization of Methyl Ester to (6)

132 grams of the ester prepared in Example 1(a) were dissolved in 1500 milliliters of benzene by stirring and heating. After adding 0.5 grams of p-toluenesulfonic acid and 10 milliliters of ethylene glycol, the solution was brought to reflux while maintaining vigorous stirring, and the azeotropic water separated. 10 milliliter aliquots of glycol were added after 1, 3, 6 and 8 hours until a total of 50 milliliters had been added. After refluxing 20 hours, the solution was cooled, diluted with chloroform and washed four times with water. The organic layer was dried with sodium sulfate and evaporated. The residual oil was crystallized from a small volume of ether yielding 123 grams (81% yield) of (6). The identity of the product was verified by elemental analysis.

1c. Reduction of (6) to Alcohol (7)

Lithium aluminum hydride solution was prepared by refluxing 100 grams of lithium aluminum hydride in 1,500 milliliters of anhydrous ether for 10 hours. After settling overnight, the clear supernatant liquid was siphoned off and stored in a thick-walled glass bottle. 250 milliliters of this solution (about 1.1 Molar) were added dropwise to a stirred solution of 114 grams of (6) in 300 milliliters of ether and 300 milliliters of benzene (both distilled from LiAlH$_4$). After stirring for 4 hours at room temperature, the excess hydride was destroyed with ethyl acetate, the solution diluted with chloroform and shaken with aqueous ammonium chloride. The organic layer was washed three times with water, dried over sodium sulfate and evaporated to dryness. The residue was recrystallized from methanol to give 96 grams (93% yield) of (7). The identity of the product was confirmed by infrared and elemental analysis.

1d. The Methanesulfonate Ester of (7)

95 grams of alcohol (7) were dissolved in 500 milliliters of pyridine and the solution cooled to 0°C in an ice bath. 40 milliliters of methanesulfonyl chloride were added to the stirred solution which was then allowed to come to room temperature. After 2 hours the reaction was poured into ice water and the product filtered, dissolved in ethyl acetate and dried over sodium sulfate. The oil remaining after evaporation of the ethyl acetate was crystallized from a large volume of ether to give 113 grams (94% yield) of product. The identity of the product was verified by elemental analysis.

1e. Nitrile (8)

112 grams of the methane sulfonate ester prepared in Example 1(d) were dissolved in 1,500 milliliters of dimethyl sulfoxide containing 75 grams of potassium cyanide. This solution was stirred at 60° C for three hours, then cooled and poured into 4 liters of ice water. The precipitate was filtered, washed with water, dissolved in chloroform and dried over sodium sulfate. The oil left after evaporation of the solvent was crystallized from methanol giving 89 grams (97% yield) of crystalline nitrile (8). The identity of the product was confirmed by spectral and elemental analysis.

1f. Raney Nickel Reduction of (8) to Aldehyde (9)

50 grams of nitrile (8) were dissolved in 400 milliliters of pyridine and a buffer solution composed of 200 grams of trisodium phosphate, 1,000 milliliters of glacial acetic acid and 400 milliliters of water. The clear mixture was heated to 55° C and about 30 milliliters of Raney nickel were added. The reaction was stirred vigorously for 3 hours and then cooled, filtered and acidified to a pH of 1 with concentrated hydrochloric acid. It was then extracted with chloroform. The extract was washed three times with water, dried over sodium sulfate and evaporated. The residue was crystallized from methyl alcohol giving 31 grams (72% yield) of aldehyde (9). The identity of the product was confirmed by spectral analysis.

1g. Azlactone (10)

To a solution of 15 grams of crystalline (9) in 400 milliliters of tetrahydrofuran (distilled from lithium aluminum hydride) were added 10.5 grams of hippuric acid, 18.5 milliliters of acetic anhydride and 11.5 grams of lead acetate (anhydrous powder). After refluxing with stirring for 2.5 hours, the solution was cooled, diluted with chloroform and washed five times with water. It was then dried over sodium sulfate and evaporated to a brown foam which was crystallized from benzene. The yield was 12.5 grams (53% yield) of the azlactone (10), melting point 154°–160° C. The identity of the product was verified by spectral analysis.

EXAMPLE 2

Condensation of Azlactone (10) with

Methyl N-t-Butyl-3-Oxoglutaramate (11)

5 grams of (10) and 3 grams of (11) were dissolved in 75 milliliters of tetrahydrofuran and 25 milliliters of ethyl (both distilled from lithium aluminum hydride under nitrogen). The reaction flask has been previously dried and flushed with nitrogen and was fitted with a gas inlet to provide a constant nitrogen atmosphere in the vessel throughout the entire reaction. Sodium hydride (1.20 grams) in a mineral oil dispersion slowly slowsly added to the stirred solution at room temperature. After stirring one hour, the solution was brought to reflux at 70° C on an oil bath and held for 30 hours. At the end of that time the solution was cooled, acidified with acetic acid, diluted with chloroform, washed four times with water, dried over sodium sulfate and evaporated to a brown foam.

This residue was taken up in a small volume of chloroform and placed on top of a chromatography column packed with about 800 grams of washed silica gel which had been previously equilibrated in a closed jar with 120 milliliters of eluant. The column was developed by adding a small amount of eluant, chloroform-acetone (95:5), at the top to maintain a head of about 2 centimeters. The stopcock was left open to allow air displaced from the silica gel to escape. As soon as solvent began flowing from the column, fractions were collected, their content analyzed on thin layer chromatography plates (silica gel : benzene-ethyl acetate 4:1 plus 1% formic acid). A total of about 4 grams (56% yield) of crystalline tetracyclic material was obtained from these fractions by crystallization with acetone. Fractions 1 to 4 yielded about 0.66 grams of isomer (12); fractions 5 and 6 yielded about 0.68 grams of isomer (14); and fractions 7 to 12 yielded about 2.7 grams of an equal mixture of isomers (13) and (15). These last two isomers were further separated by fractional crystallization from acetone. The products were each characterized by melting points as follows:

Isomer (12) had a melting point of 228°–232° C;
Isomer (13) had a melting point of 240°–244° C;
Isomer (14) had a melting point of 214°–222° C;
Isomer (15) had a melting point of 230°–237° C.

The identity of each isomer was further confirmed by spectral analysis.

EXAMPLE 3

Hydroxylation of (14) to (15) (A)

1.0 grams of (14) was dissolved in 40 milliliters of dimethyl formamide and 100 milliliters of tetrahydrofuran. 280 milligrams of triethyl phosphite were added followed by 200 milligrams of sodium hydride dispersed in mineral oil. Oxygen was bubbled into this solution for 10 minutes and the color changed from fluorescent orange to dull green. A drop of this solution placed in methanolic sodium borate showed that the absorption in the visible region of the spectrum had disappeared and been replaced by a new maximum at about 350 millimicrons. (It was noted on several occasions that reaction with oxygen did not immediately occur — no color change. In these instances it was necessary to initiate the reaction by adding up to 10 drops of water.) The oxygenated solution was then acidified with acetic acid, diluted with chloroform and washed 4 times with water. It was dried over sodium sulfate and evaporated. The product (15) (A) could be crystallized directly from methanol. 0.740 grams of pure crystalline (15) (A) were obtained. The identity of the product was confirmed by spectral and elemental analyses.

EXAMPLE 4

Conversion of the Benzamide (15) (A) to the Dimethylamino Compound (17)

10 milliliters of ether (distilled from lithium aluminum hydride) were injected into a 50 milliliter three-neck flask containing a nitrogen atmosphere and fitted with a syringe cap. The 0.820 milliliters of boron trifluoride etherate and 0.400 milliliters of epichlorohydrin were added and the solution stirred vigorously overnight. The white solid (triethyloxonium tetrafluoroborate) was washed with fresh ether with the aid of a 10-milliliter syringe fitted with a long needle. The salt was dissolved in a small volume of dry dichloromethane and reprecipitated with 10 milliliters of ether. After washing once again with ether, the salt was dissolved in 10 milliliters of dichloromethane and 430 milligrams of (15) (A) suspended in 20 milliliters of dichloromethane were added. After 48 hours at room temperature the excess of a 5 percent potassium carbonate solution in water was added and stirred vigorously for one-half hour. The organic layer was separated, dried and evaporated.

The residue was then dissolved in 16 milliliters of tetrahydrofuran, 8 milliliters of 0.1 Normal HCl were added and the solution was allowed to stand at room temperature for 1 hour. After diluting with chloroform, the reaction solution was washed with water, dried over sodium sulfate and evaporated to a dark oil which was titurated with warm ether to give 265 milligrams of the amine hydrochloride (16) as a light amorphous powder. This powder proved to be better than 90 percent pure on thin layer chromatography. The identity of the product was confirmed by means of its ultraviolet spectrum, molecular weight and mass spectrum.

0.100 grams of the amine (16) was dissolved in 10 milliliters of chloroform containing 0.38 milliliters of diisopropyl ethylamine. 0.17 milliliters of dimethyl sulfate was added and the reaction stirred at room temperature while following its progress on thin layer chromatography. When all starting material and monoalkylation product had disappeared (about 12 hours), the chloroform solution was shaken three times with dilute hydrochloric acid (pH 1) and once with neutral water, dried over sodium sulfate and evaporated. The residue was crystallized from chloroform-methanol to give 59 milligrams (56% yield) of the dimethylamino compound (17). It was characterized by its melting point of 247°–251° C (decomposition). The identity of the product was confirmed by spectral and elemental analysis.

EXAMPLE 5

Removal of the Methoxy and N-t-Butyl Protecting Groups 0.040 grams of the dimethylamino (17) was placed in a small test tube with 3 milliliters of 48 percent hydrobromic acid and nitrogen was bubbled into the acid for 5 minutes at room temperature. The test tube was then lowered into an oil bath which had been preheated to 100° and the nitrogen bubbling continued while heating the acid solution. After 5 minutes of heating all of (17) had been dissolved. Heating was continued for an additional 15 minutes. The clear solution was cooled, diluted with 10 milliliters of water, neutralized to a pH of 7 with 20 percent aqueous sodium hydroxide, and extracted twice with 10 milliliter portions of n-butanol. The butanol extracts were combined, washed with water, and evaporated to a tan, dry solid which was dissolved in a small volume of acidic ethanol and chromatographed on a short column filled with dry, untreated polyamide powder using absolute ethanol as the eluant. The first few fractions were crystallized and 23 milligrams (64% yield) of compound (18) were obtained. The compound obtained was characterized by a melting point of 248°–250° C decomposition (dimorphic, mp 213°–215° C dec.). The identity of the product was further confirmed by its spectral and elemental analysis.

Examples 1–5 are schematically represented by the structural formulas (5)–(18) set forth below.

EXAMPLE 6

A sample of the compound

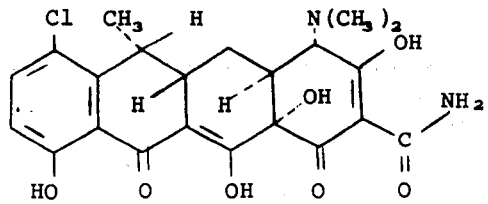

was submitted for biological testing to determine its activity against various microorganisms. The results were as follows:

|  | micrograms/ml |
|---|---|
| Staph. aureus | 0.78 |
| Staph. aureus, tetracyeline resistant strain | 0.04 |
| Strept. pyogenes | 0.78 |
| E. coli | 12.5 |
| P. multocida | 0.19 |
| Salo typhosa | 25 |

The foregoing activity was considered exceptionally favorable. It is of particular significance that the unnatural tetracycline showed marked activity against a strain of Staph. aureus normally resistant to tetracycline-type antibiotics.

In like manner, other C-5a epi tetracyclines have been evaluated for their biological activity. For example, the compound

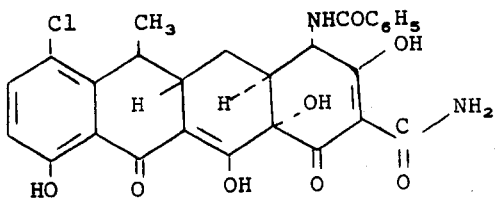

showed that it was as active as the benzamide of the fully biologically active 6-deoxy-6-demethyl tetracycline, and also showed activity against normally resistant bacterial strains.

The 5a epi tetracyclines of the present invention also offer intermediates to the other tetracyclic compounds.

EXAMPLE 7

1 gram of

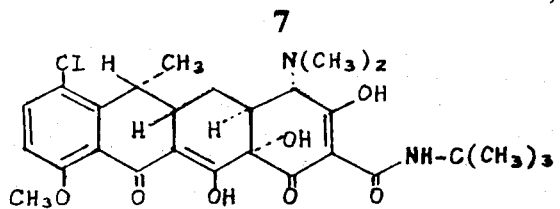
was dissolved in 75 ml of 48% hydrobromic acid. The solution was heated on a steam bath for 50 minutes then the solvent was evaporated and the crystalline residue was recrystallized from ethanol and a few drops of hydrobromic acid. The yield of the product
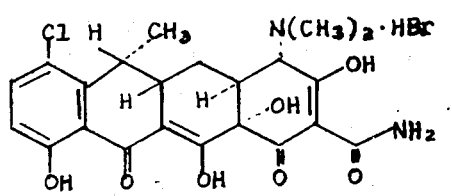
was 95 percent. Melting with decomposition above 240°. Identity is confirmed by spectral and elemental analyses.
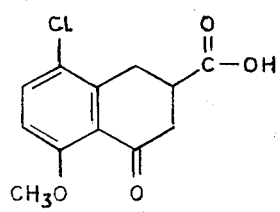 (5)
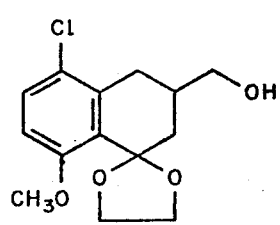 (6)
(7)
(8)
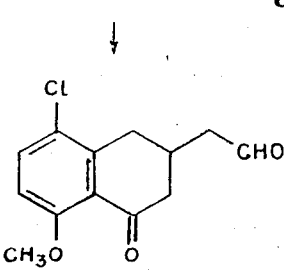 (9)
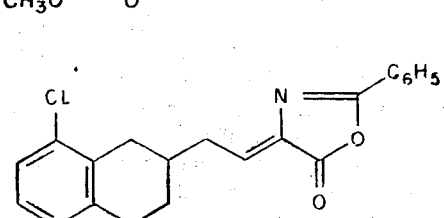 (10)
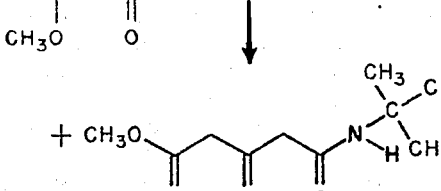 (11)
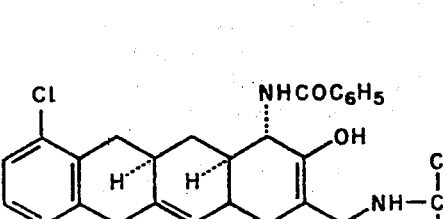 (12)
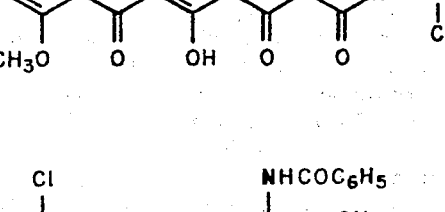 (13)
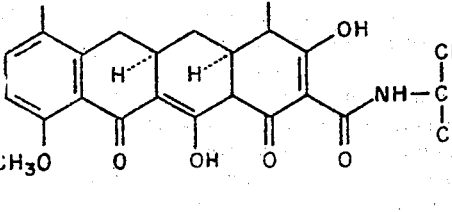 (14)
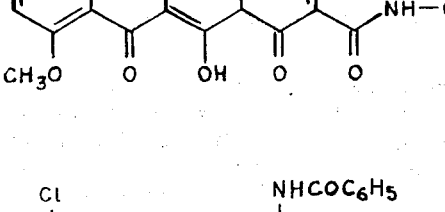 (15)
\* \* \* \*

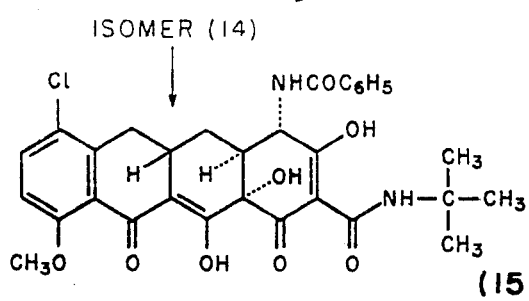
ISOMER (14)
(15) (A)
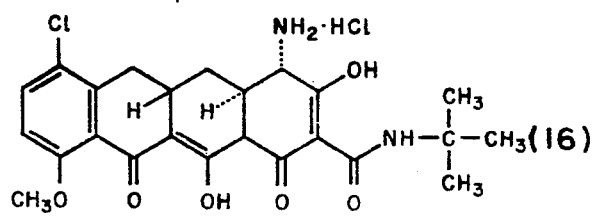
(16)
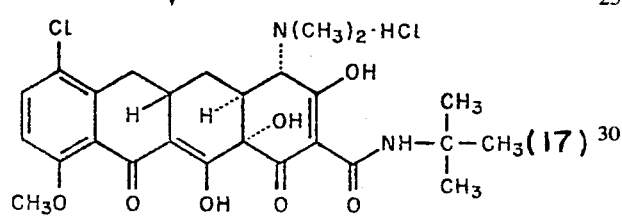
(17)
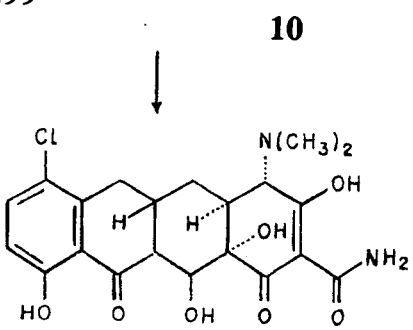
(18)
I claim:
1. The compound
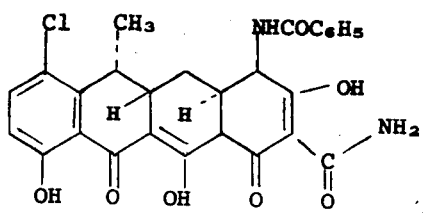
2. The compound
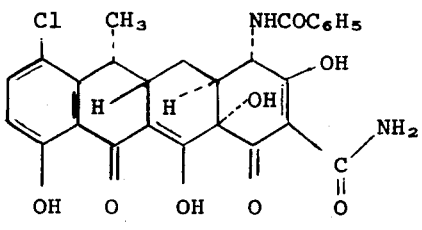
* * * * *

UNITED STATES PATENT AND TRADEMARK OFFICE
CERTIFICATE OF CORRECTION

PATENT NO. : 3,914,299
DATED : October 21, 1975
INVENTOR(S) : Hans H. Muxfeldt

It is certified that error appears in the above-identified patent and that said Letters Patent are hereby corrected as shown below:

Col. 1, line 21, "compound" should read -- compounds --;

Col. 1, structural formula (2), insert a double bond between the second and third carbon positions;

Col. 2, line 32, after "preparation" insert a comma and after "follow," insert -- is --;

Col. 4, line 1, "ethyl" should read -- ether --;

Col. 4, line 6, after "dispersion" insert -- was --;

Col. 4, line 7, delete "slowsly"; and

Col. 8, line 20, delete the arrow leading from Formula (10) to Formula (11), and place it alongside Formula (11) and leading to Formula (12).

Signed and Sealed this tenth Day of February 1976

[SEAL]

Attest:

RUTH C. MASON
Attesting Officer

C. MARSHALL DANN
Commissioner of Patents and Trademarks